LA VERNE NOYES.
LUBRICATING MECHANISM.
APPLICATION FILED JAN. 25, 1915.

1,151,815.

Patented Aug. 31, 1915.
2 SHEETS—SHEET 1.

Witnesses:
Robert H. Weir
Arthur W. Carlson

Inventor
La Verne Noyes
By G. L. Cragg
Atty.

LA VERNE NOYES.
LUBRICATING MECHANISM.
APPLICATION FILED JAN. 25, 1915.
1,151,815. Patented Aug. 31, 1915.
2 SHEETS—SHEET 2.
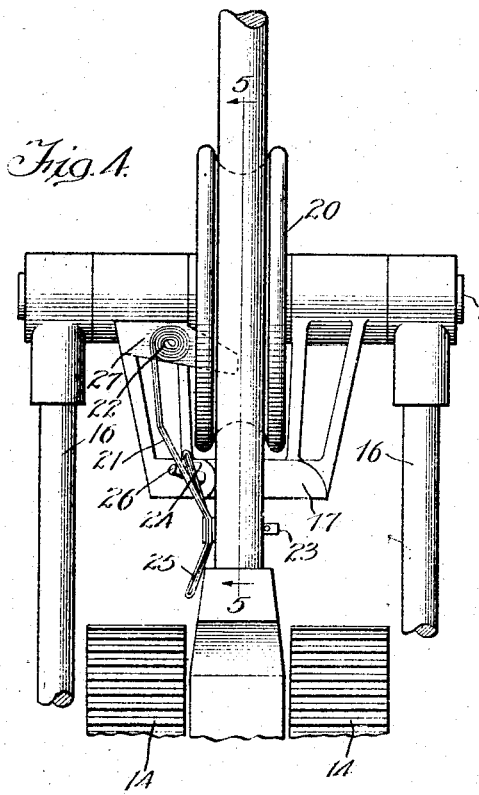
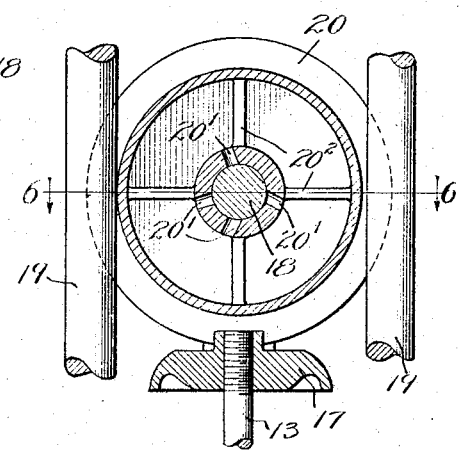
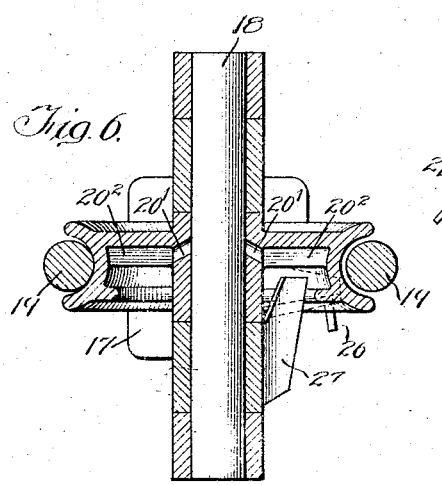
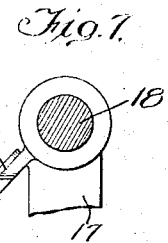
Witnesses:
Robert H. Weir
Arthur W. Coulson
Inventor
LaVerne Noyes
by C. L. Cragg Atty.

UNITED STATES PATENT OFFICE.

LA VERNE NOYES, OF CHICAGO, ILLINOIS, ASSIGNOR TO AERMOTOR COMPANY, OF CHICAGO, ILLINOIS, A CORPORATION OF ILLINOIS.

LUBRICATING MECHANISM.

1,151,815.  Specification of Letters Patent.  Patented Aug. 31, 1915.

Application filed January 25, 1915. Serial No. 4,165.

*To all whom it may concern:*

Be it known that I, LA VERNE NOYES, citizen of the United States, residing at Chicago, in the county of Cook and State of Illinois, have invented a certain new and useful Improvement in Lubricating Mechanism, of which the following is a full, clear, concise, and exact description, reference being had to the accompanying drawings, forming a part of this specification.

My invention relates to lubricating mechanism and, in one of its embodiments, finds particular service in the lubrication of portions of wind mill structures, though the invention is not to be limited to this adaptation.

The mechanism of my invention includes an oscillating lubricant carrier that, in one of its positions, is adapted to take up lubricant from a suitable source or conveyer and in another of its positions is adapted to deposit for use the lubricant it takes. Where the invention is employed in connection with power-transmitting gearing, a wheel of the gearing is preferably caused to act as a lubricant conveyer, the oscillating lubricant carrier being intermittently applied to this gear wheel and in the intervals between applications it is applied to the place at which the lubricant is to be taken for use.

Figure 1:
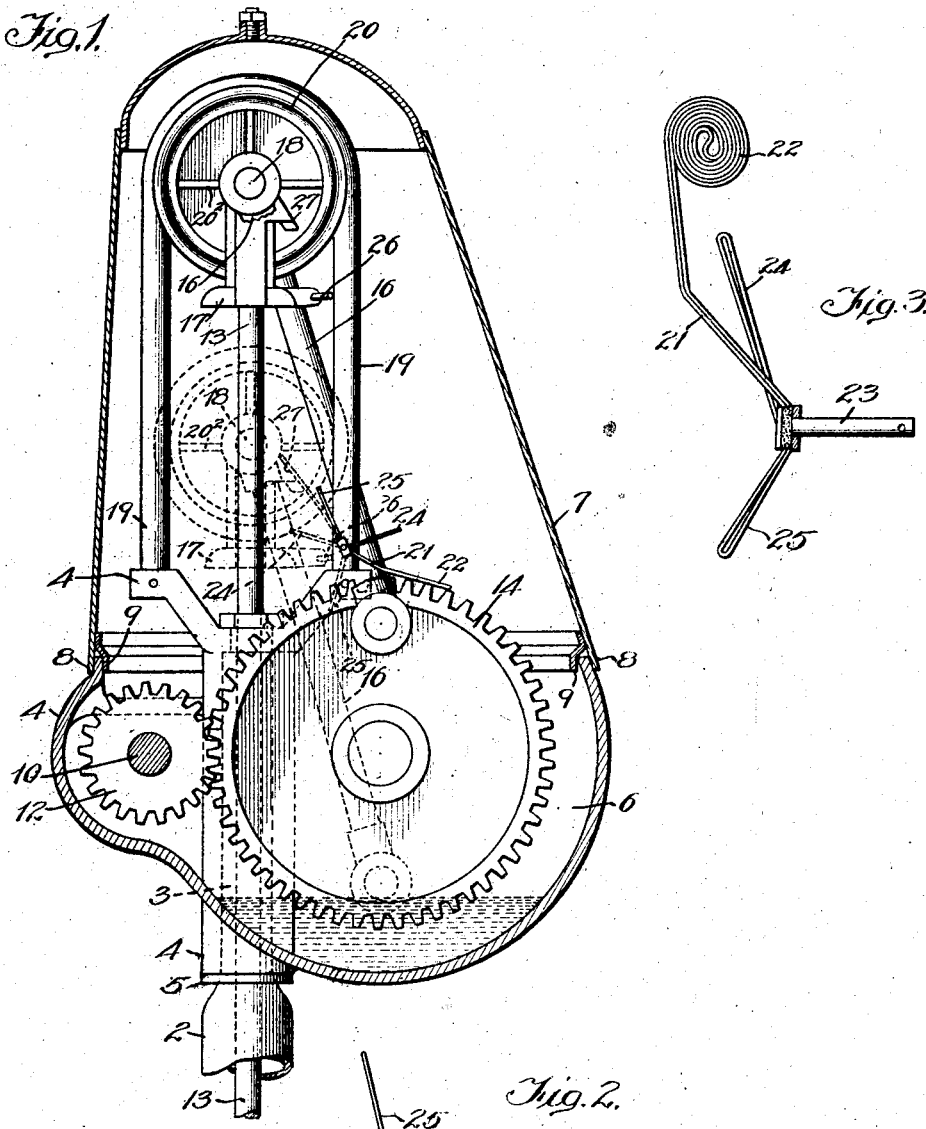
Figure 3:
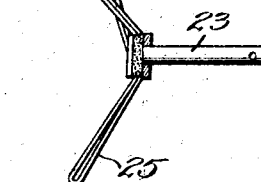
Figure 2:
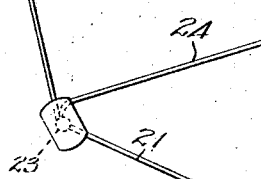

I will explain my invention more fully by reference to the accompanying drawings showing the preferred embodiment thereof and in which—
Figure 1 is a view in sectional elevation, with portions broken away, of a part of a wind mill structure equipped in accordance with the invention; Fig. 2 is a view of the lubricant carrier portion shown in Fig. 1 on a larger scale; Fig. 3 is a view of the carrier taken in a direction at right angles to that in which Fig. 2 is taken; Fig. 4 is a view of a part of the mechanism shown by dotted lines in Fig. 1 on a larger scale and taken in a direction at right angles to the direction in which Fig. 1 is taken; Fig. 5 is a view on line 5 5 of Fig. 4; Fig. 6 is a view on line 6.6 of Fig. 5; and Fig. 7 illustrates a detail of construction.
Like parts are indicated by similar characters of reference throughout the different figures.

The top of the tower terminates in an upright stationary tubular column 2 whose reduced upper end constitutes an upright shaft 3 affording an upright axis about which the wind mill head 4 may turn upon a step bearing ring 5 supported upon the lower column portion. The wind mill head 4 is enlarged into an oil chamber 6 that may contain lubricant for the gearing. A chamber closing hood 7 has sheds 8 and 9 between which the chamber rim is received and which respectively prevent entrance of water and the exit of oil at said rim. The shaft 10 of the wind wheel is journaled in enlargements of walls of the chamber 6, and carries upright pinions 12 for driving the upright pump or load rod 13. Upright transmission gears 14 are in mesh with pinions 12 and are journaled within bearings carried by the head 4. Pitmen 16 connect gears 14 with the upper end of load rod 13. A stirrup 17 is fixed upon the upper end of the load rod and carries bearings in which a shaft 18 turns. The outer ends of this shaft are in fixed connection with the upper ends of the pitmen 16 whereby the pitmen are maintained in proper inter-relation without relying upon a guide structure to perform this function. The gears and pitmen are equidistant from a plane parallel to the gears and which plane includes the axis of the load shaft, whereby the driving force upon the load rod is evenly distributed. The head 4 carries an upright stirrup 19 whose parallel branches constitute upright guides that are simultaneously received in the groove of an anti-friction wheel or roller 20 that turns on and with respect to the shaft 18. Said roller is permitted very slight bodily movement in the plane of the stirrup 19 so that it may have rolling engagement with but one vertical branch of the stirrup 19 at a time. The friction which is thus reduced may be still further reduced if the vertical guides do not have to take part in maintaining the pitmen in proper inter-relation, a function which is avoided if the shaft 18 is in rigid relation to the pitmen, as hitherto described.

The lubricant carrier of my invention is desirably formed of a single wire doubled upon itself first to constitute a carrier stem 21 and then to constitute the lubricant carrier proper 22, the stem 21 being mounted at 23 to oscillate. The lubricant carrier is desirably provided with two arms 24, 25 which branch therefrom at the base of the stem 21.
The pivot pin 23 is journaled within the right hand branch of the stirrup 19 at the base of this branch so that one or the other of the arms 24, 25 is in the vertical path of movement of the pin 26 mounted upon the base portion of the stirrup 17, alternative vertical positions of this pin being illustrated by the full and dotted lines in Fig. 1. When the stirrup 17 has moved to the upper limit of its travel (that is when the pump or load rod is at the extreme of its upward movement) the pin 26 is located in vertical alinement with an intermediate portion of the arm 25 so that when the stirrup 17 and the load rod are brought to their lowermost positions the descending pin 26 will encounter the arm 25 to move it, together with the carrier 22, in a counter clockwise direction, the movement being positive until the center of gravity of the entire lubricant carrier structure has been placed to the left of the vertical line through the pivot 23 whereafter the balance of the movement of the carrier is effected by gravity and is limited by the engagement of the portion 22 with a lubricant guide 27 to which the lubricant is to be applied, in this case for transfer, as will more fully appear. It do not wish to be limited, however, to arresting the counter-clockwise movement of the carrier 22 by its engagement with the conveyer 27 but I prefer thus to stop this movement of the carrier since not only is lubricant dislodged from the carrier by the sudden arrest of its motion but lubricant may also be passed from the carrier due to conduction arising during the interval of time required to bring the pin 26, in its upward movement, into engagement with the arm 24 which was caused to overlie the pin consequent upon its descent. When the pin 26 thus encounters the arm 24 it turns the lubricant carrier structure in a clockwise direction to restore the same to the position illustrated by full lines in Fig. 1 where the part 22 rests upon the teeth of one of the gears 14 whereby oil which is upwardly conveyed by this gear is transferred to the carrier portion 22 during the completion of the upward movement of the pin or other actuator 26 and during the time required again to bring this pin 26 into engagement with the arm 25 again to bring the carrier portion 22 forcibly into contact with the conveyer part 27. Thus the gear wheel 14 itself constitutes a source of lubricant supply to which the carrier 22 is brought for the purpose of taking some of the lubricant from such supply and while I prefer to interpose such an element 14 between the lubricant carrier and a main source of oil supply in the oil case 6 I do not wish to be limited to this arrangement.

The conveyer portion or place of oil deposit 27 is, in the form of the invention shown, arranged to direct the oil into the annular space that is circumscribed by the rim of the pulley 20, the hub portions of this pulley having openings 20¹ through which the oil will flow to lubricate the shaft 18 and said hub portion of the wheel 20. Said wheel is desirably provided with radial fins 20² to promote passage of the oil into the openings 20¹. There is also surface conduction of the oil which will lead it to the peripheral groove in the wheel to oil this groove and the part of the inverted stirrup 19 engaged by the groove.

No claim is made herein to the gearing and wind mill features apart from the lubricating mechanism, there being other applications pending in which the wind mill and gearing features are claimed, among them being applications Serial No. 830,627, filed April 9, 1914, and Serial No. 865,451, filed October 7, 1914.

While I have herein shown and particularly described the preferred embodiment of my invention I do not wish to be limited to the precise details of construction shown as changes may readily be made without departing from the spirit of my invention, but

Having thus described by invention I claim as new and desire to secure by Letters Patent the following:—

1. Lubricating mechanism including an oscillating lubricant carrier; a source of lubricant which the carrier is adapted to reach; a portion located above the carrier mounting and positioned to enable the carrier to transfer lubricant thereto; and means for effecting the oscillation of the lubricant carrier between said source and the portion to which lubricant is to be transferred, said means and carrier being in separable relation during the final part of the movement of the carrier toward said portion, while said portion is sufficiently far removed from the carrier structure to permit the final part of the movement of said carrier to be effected toward said portion by gravity.

2. Lubricating mechanism including an oscillating lubricant carrier; a source of lubricant which the carrier is adapted to reach; a portion positioned to enable the carrier to transfer lubricant thereto; and means for effecting the oscillation of the lubricant carrier between said source and the portion to which lubricant is to be transferred, said carrier having two arms while the means for oscillating the carrier includes a part so related to the arms that this part will engage one of the arms to move the carrier toward the source of lubricant and will engage the other arm to reverse the movement of the carrier.

3. Lubricating mechanism including an oscillating lubricant carrier; a source of lubricant which the carrier is adapted to reach; a portion located above the carrier mounting and positioned to enable the carrier to transfer lubricant thereto; and means for effecting the oscillation of the lubricant carrier between said source and the portion to which lubricant is to be transferred, said means and carrier being in separable relation during the final part of the movement of the carrier toward said portion, while said portion is sufficiently far removed from the carrier structure to permit the final part of the movement of said carrier to be effected toward said portion by gravity, said carrier having two arms while the means for oscillating the carrier includes a part so related to the arms that this part will engage one of the arms to move the carrier toward the source of lubricant and will engage the other arm to reverse the movement of the carrier.

4. Lubricating mechanism including an oil chamber; a gear wheel projecting within the oil space in the oil chamber; an oscillating lubricant carrier; and mechanism for causing the lubricant carrier to move alternately to the gear wheel to receive lubricant conveyed upwardly thereby and to a place to which the lubricant is to be transferred.

5. Lubricating mechanism including an oil chamber; a gear wheel projecting within the oil space in the oil chamber; a pitman operated by the gear wheel; a load element operated by the pitman; a guide for confining the load element substantially to vertical movement; an oscillating lubricant carrier; and an actuator moving with the load element for causing the lubricant carrier to move alternately to the gear wheel to receive lubricant conveyed upwardly thereby and to a place to which the lubricant is to be transferred.

6. Lubricating mechanism including an oil chamber; a gear wheel projecting within the oil space in the oil chamber; a pitman operated by the gear wheel; a load element operated by the pitman; a guide for confining the load element substantially to vertical movement; an oscillating lubricant carrier; and an actuator moving with the load element for causing the lubricant carrier to move alternately to the gear wheel to receive lubricant conveyed upwardly thereby and to a part moving with the load element to which the lubricant is to be transferred.

7. Lubricating mechanism including an oil chamber; a gear wheel projecting within the oil space in the oil chamber; a pitman operated by the gear wheel; a load element operated by the pitman; a guide for confining the load element substantially to vertical movement; an oscillating lubricant carrier; and an actuator moving with the load element for causing the lubricant carrier to move alternately to the gear wheel to receive lubricant conveyed upwardly thereby and to a place to which the lubricant is to be transferred, said carrier including two arms one related to the actuator to be engaged thereby to move the carrier toward the gear wheel and the other to be engaged thereby to move the carrier from the gear wheel.

8. Lubricating mechanism including an oil chamber; a gear wheel projecting within the oil space in the oil chamber; a pitman operated by the gear wheel; a load element operated by the pitman; a guide for confining the load element substantially to vertical movement; an oscillating lubricant carrier; and an actuator moving with the load element for causing the lubricant carrier to move alternately to the gear wheel to receive lubricant conveyed upwardly thereby and to a part moving with the load element to which the lubricant is to be transferred, said carrier including two arms one related to the actuator to be engaged thereby to move the carrier toward the gear wheel and the other to be engaged thereby to move the carrier from the gear wheel.

In witness whereof I hereunto subscribe my name this fifteenth day of January, A. D. 1915.

LA VERNE NOYES.

Witnesses:
 DANIEL R. SCHOLES,
 F. L. DOLE.